Sept. 28, 1948.     S. B. SMITH     2,450,364
WRAPPER FOR FROZEN CONFECTIONS
Filed June 30, 1945
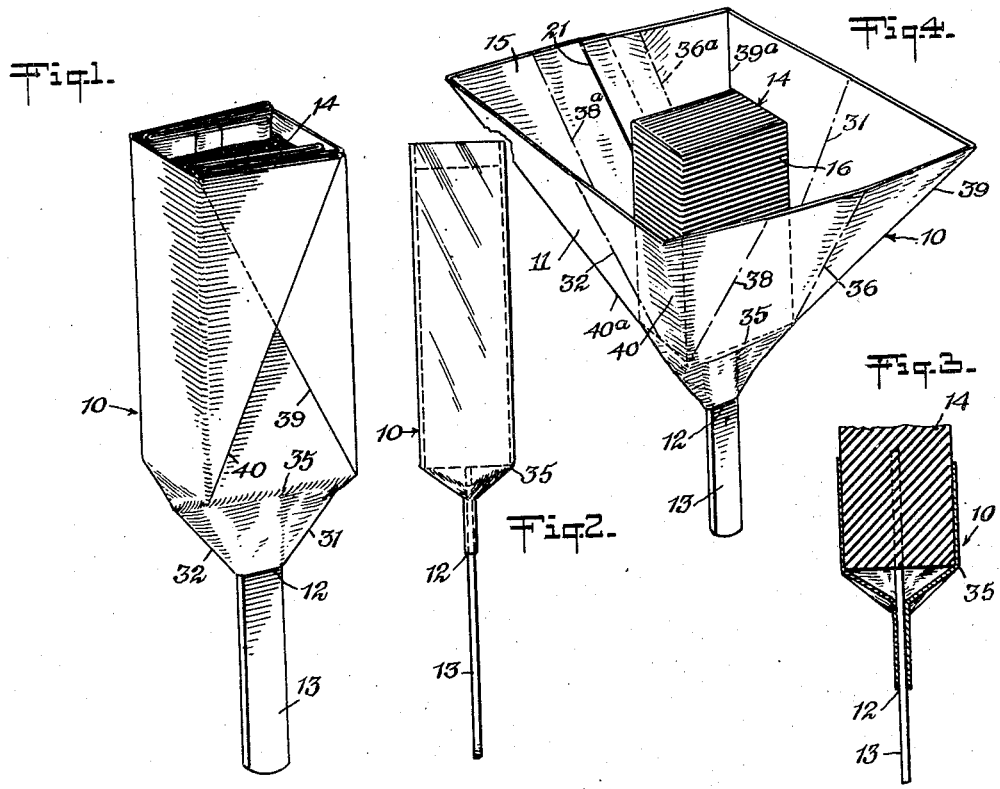
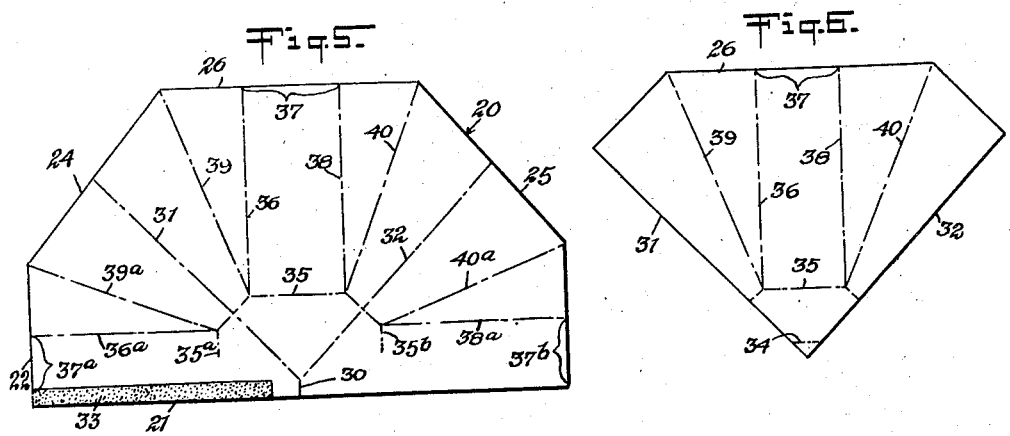
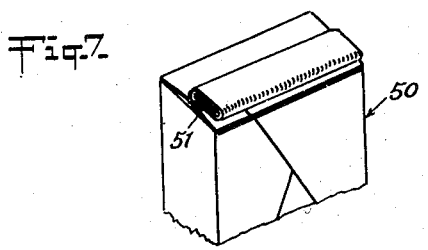
INVENTOR.
Sidney B. Smith
BY
Munn, Liddy & Glaccum
Attorneys Patented Sept. 28, 1948

2,450,364

UNITED STATES PATENT OFFICE 2,450,364

WRAPPER FOR FROZEN CONFECTIONS

Sidney B. Smith, Hollis, N. Y.

Application June 30, 1945, Serial No. 602,595

3 Claims. (Cl. 99—180)

The present invention relates to wrappers for frozen confections and especially for ice cream, ice and sherbet confections in which a stick is partly embedded, the exposed end thereof constituting a handle by which said confection is held.

The principal object of the invention is to provide a wrapper of the character described which constitutes not only a wrapper, but also a cup or container adapted to catch the drippings and fragments from said confections while they are being consumed.

A further object, which is also a primary object of the invention, is the provision of a wrapper of the character described which constitutes, when opened, an insulating envelope which confines the air cooled by the confection to the area immediately surrounding said confection.

Another object of the invention is the provision of a handy wrapper for frozen confections which may readily be applied thereto by means of automatic wrapping machinery and which may be readily opened for consumption of the frozen confection.

Still another object of the invention is the provision of a wrapper of the character described which affords substantial sanitary protection to the confection from the point of manufacture and packaging thereof to the time when it is consumed.

A still further object of the invention is the provision of a wrapper for frozen confections which eliminates the need for distributing with each frozen confection sold a paper napkin normally used by the consumer as a guard against drippings from the frozen confection.

Preferred embodiments of the invention are shown in the accompanying drawing in which—

Fig. 1 shows, in perspective, one form of the wrapper as it appears on a typical frozen confection in which a stick is embedded;

Fig. 2 is a side view thereof;

Fig. 3 is a fragmentary view thereof in vertical section;

Fig. 4 is a perspective view thereof showing how the wrapper appears when it is opened;

Fig. 5 is a view of a blank of which the wrapper is made;

Fig. 6 is a view of said blank showing how it looks after its free edges have been glued together; and Fig. 7 is a fragmentary perspective view of another form of wrapper.

It will be observed in Fig. 4 that the wrapper 10 comprises, essentially, a wrapping which is shaped like a vessel, small at the bottom, large at the top, the sides 11 tapering upwardly and outwardly from bottom to top. The sides are closed and the bottom is provided with a small opening 12 through which the stick 13 of a standard confection 14 is known commonly as an "ice cream pop" is inserted. The top of the wrapper is provided with a large opening 15 through which the ice cream 16 or other confection may be consumed. It will be noted that a considerable space separates the wrapper 10 from the sides of the confection 16. There is good reason for providing this space, namely, to provide a layer of air immediately surrounding the confection 16 which is confined to the general area surrounding said confection. Since the confection is ordinarily eaten in a climate where the temperature of the air is considerably higher than the temperature of the confection, the layer of air immediately surrounding said confection will also be of a temperature considerably higher than the air of the atmosphere. The wrapper prevents this cooler layer of air from intermingling with the air of the atmosphere and by the same token prevents the air of the atmosphere from intermingling with said layer of cooler air. Such being the case, a form of insulation is provided for the frozen confection which slows the process of melting thereof to a marked extent. Another reason for this construction is the provision of a catch basin for the drippings and fragments which normally fall from a frozen confection during consumption thereof. It is clear that neither of these two objects would be attained if the wrapper were of a shape and size to hug the confection closely. It is known that such close fitting wrappers do exist but these wrappers, unlike the wrapper herein described and claimed, cannot and do not provide the catch basin and insulation features of the present wrapper.

The wrapper shown in Fig. 4 is shown open, the confection ready for consumption. This, however, is not the way the wrapper appears for shipping and selling purposes. In Fig. 1 the wrapper is shown folded snugly around the confection for shipping and selling purposes. In Fig. 5 the wrapper is shown in its embryo form, to wit, in the form of a blank, before gluing, folding and wrapping upon the confection.

Referring now to Fig. 5, it will be seen that the blank 20 comprises a flat sheet of wrapping material having one long side 21, two short sides 22 and 23, respectively, which met the ends of said side 21 at right angles thereto, two sides 24 and 25 which are somewhat longer than sides 22 and 23 and which meet said sides 22 and 23 at an angle of approximately 45°, and a sixth side 26 which is slightly longer than the sides 24 and 25 and which join said sides 24 and 25, meeting said sides at an angle of approximately 45°, said side 26 and the long side 21 being parallel to each other. It will be seen from the foregoing and from Fig. 5 that the blank comprises one-half of an octagonally shaped sheet.

To prepare the blank 20 for wrapping around the frozen confection 14, three things are done to it: (a) a slit is cut into said blank on the line 30 (b) fold lines 31 and 32 which radiate from the top of said slit 30 are also formed in said blank (c) an application of glue 33 is made to the lower side of the blank paralleling and adjacent to the side 21 on either side of the slit 30 but not on both sides. This having been done, the two parts of the side 21 which are separated by the slit 30 are brought together in superimposed fashion as shown in Fig. 4 and are held together in that position by means of the glue 33. To accomplish this, the blank is folded on the lines 31 and 32 and in consequence of such folding and such gluing, a cone shaped container is provided as shown in Fig. 6. The next step in the process of manufacturing the wrapper 10 is to cut off the apex of the cone on the dotted line 34. This leaves the opening hereinbefore described and referred to by the character reference 12. The frozen confection 14 and more particularly the stick 13 thereof is now inserted through the hole 12.

The rectangular panel formed by the lines 35, 36, 37 and 38 in Figs. 5 and 6 is now brought into contact with one of the wide sides of the confection 16. The rectangular panel formed opposite said first mentioned rectangular panel by the lines 35a, 35b, 36a, 37a, 37b and 38a is now brought into contact with the opposite wide side of the frozen confection 16. The folding lines 31 and 32 are now brought up against the narrow sides of the frozen confection. The operation which accomplishes this causes fold lines to appear on the lines 36, 36a, 38, 38a and also on the lines 39, 39a, 40 and 40a. It is now possible to fold the panels which are formed between the folding lines 31 and 39, 39 and 36, 38 and 40, 40 and 32, 32 and 40a, 40a and 38a, 36a and 39a, and 39a and 31, flat upon the wide sides of the confection 16. The wrapper 10 is now wrapped snugly around the frozen confection in the manner shown in Fig. 1.

To consume the frozen confection, the wrapper is opened as shown in Fig. 4. It is understood, of course, that the confection is consumed from the top down. To facilitate this operation, the top sides of the wrapper are either rolled or crushed down or else the entire wrapper is pulled down from the bottom along the stick 13. It will be noted that a tight fit is provided between the wrapper and the stick at the opening 12. The purpose of this is to prevent the drippings from passing out of the wrapper through said opening. It may be said that the average person eating a confection of this sort normally holds the stick in such manner that the thumb and forefinger make contact with the stick immediately below the confection 16 mounted thereon. Since, in the present case, the wrapper extends for a considerable distance below said confection 16, the thumb and forefinger of the average person eating the confection wrapped in this manner would make contact with the lower portion of the wrapper and further seal the same against passage of the drippings through said hole 12.

Fig. 7 shows the second embodiment of the present invention and it shows it to differ only in that the top of the wrapper is closed, whereas the top of the wrapper 10 shown clearly in Fig. 1 is open. The wrapper 50 shown in Fig. 7 is prepared from a blank which is identical in all respects with the blank shown in Fig. 5, except that it is somewhat longer. The folding operation with respect to wrapper 50 is identical with that above described with respect to wrapper 10, except that one further step is provided. The top of the wrapper, which extends a considerable distance above the top of the confection is folded flat against itself and then rolled over in the manner shown in Fig. 7 thereby forming the rolled seal 51 therein shown. This type of wrapper has the advantage of providing a more sanitary package for the frozen confection.

The above description is of preferred embodiments only of the invention and it is clear that modifications and variations may be incorporated therein without departing from the basic principles of the invention. The material of which the wrapper is made may be of any conventional material used for the purpose indicated and it may comprise a waxed paper or any similar type of wrapping paper. The wrapper 10 as shown in Fig. 4 comprises an inverted pyramid having four sides. It is of course clear that a wrapper of any other shape is herein contemplated which has closed sides, a small opening at the bottom, and a large opening at the top and a space between the inner surface of the wrapper and the outer surface of the confection. The package shown in Fig. 7 may be provided with a gummed label for more securely sealing the rolled closure 51.

I claim:

1. A wrapper for a frozen confection mounted on the end of a stick, said wrapper comprising, when opened to expose the confection for consumption, a container having the shape of a hollow inverted pyramid, the lower end of said inverted pyramid-shaped container having a small opening formed therein through which the stick extends, the stick being held snugly in said hole to provide a relatively fluid tight slit between said stick and said container, the upper end of said container being open and being relatively widely spaced from the frozen confection, thereby confining a layer of cooled air around said confection to reduce its melting rate, said container serving also, by reason of its spaced relationship with respect to the frozen confection, as a catch basin for the drippings therefrom.

2. A wrapper for a frozen confection mounted on the end of a stick, said wrapper comprising, when opened to expose the confection for consumption, a hollow inverted pyramid which has a small opening at the bottom through which the stick extends, a snug fit being maintained between said stick and the edges of said opening to prevent leaks therethrough, contact between said container and the frozen confection being provided only along the lower edges of said confection, said container flaring away from the sides of said confection to provide a relatively wide space between the upper portion of said confection and the upper open end of said container, whereby a layer of cooled air may be confined around said confection to reduce its melting rate, the outward flare of said container being sufficient to expose the entire upper portion of said confection, including its sides, for consumption.

3. A wrapper in accordance with claim 2 for use in connection with a frozen confection having four substantially parallel side corners, in which the inverted pyramid-shaped container is provided with folding lines along the corners of the pyramid and additional folding lines between said corners, said additional folding lines corresponding in spacing and location to the four corners of the confection, whereby the container may be folded flat against the sides of the confection for packing purposes.

SIDNEY B. SMITH.

REFERENCES CITED

The following references are of record in the file of this patent:

UNITED STATES PATENTS

| Number | Name | Date |
|---|---|---|
| 1,174,593 | McClurg | Mar. 7, 1916 |
| 1,761,703 | Brimer | June 3, 1930 |
| 2,027,791 | Schrager | Jan. 14, 1936 |
| 2,028,974 | Galloway | Jan. 28, 1936 |